Feb. 14, 1961
M. E. WOOD
2,971,720
SPINNING REEL
Filed Dec. 5, 1955
3 Sheets-Sheet 1
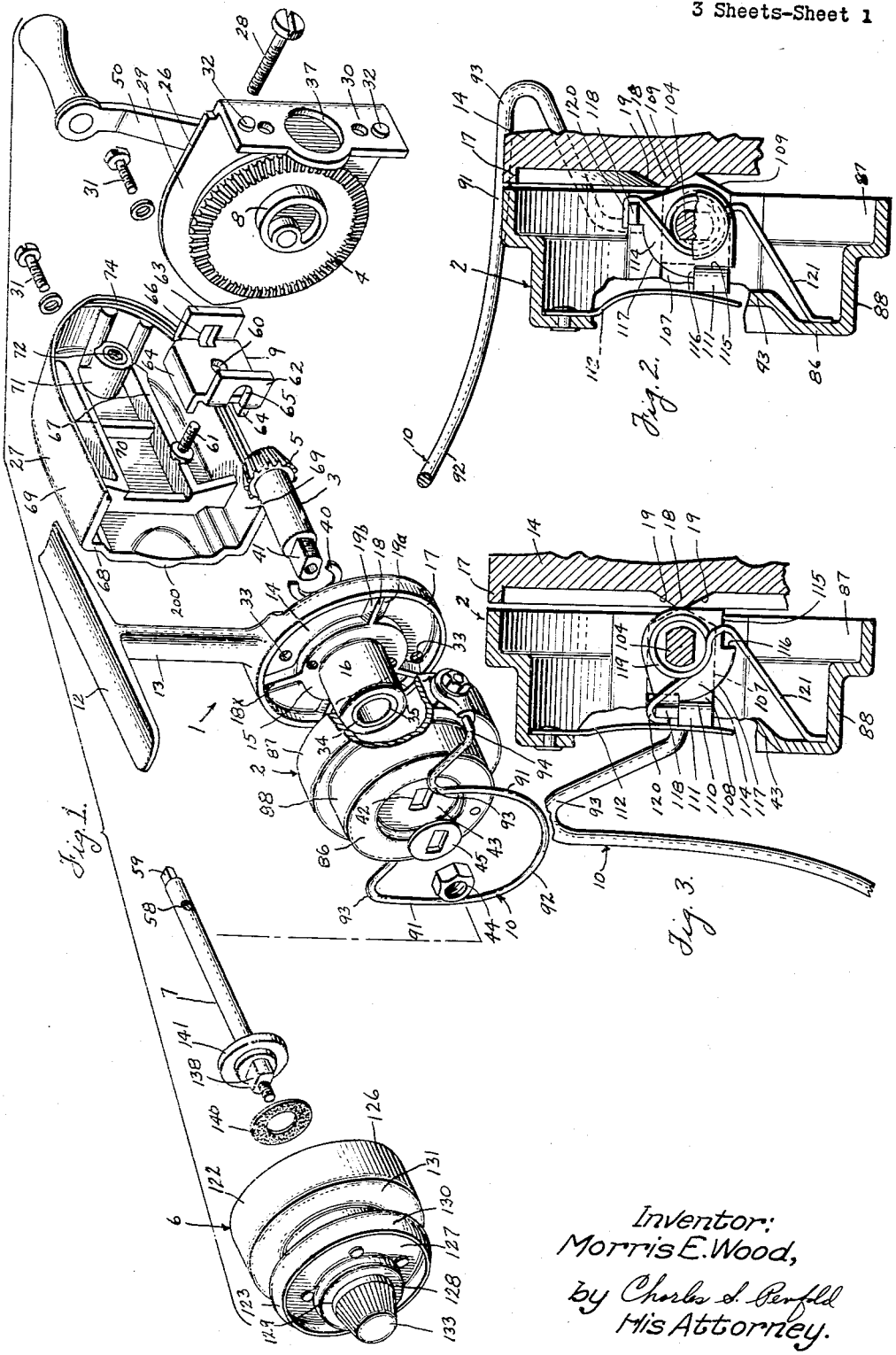
Inventor:
Morris E. Wood,
by Charles A. Penfold
His Attorney.

Feb. 14, 1961 — M. E. WOOD — 2,971,720
SPINNING REEL
Filed Dec. 5, 1955 — 3 Sheets-Sheet 2
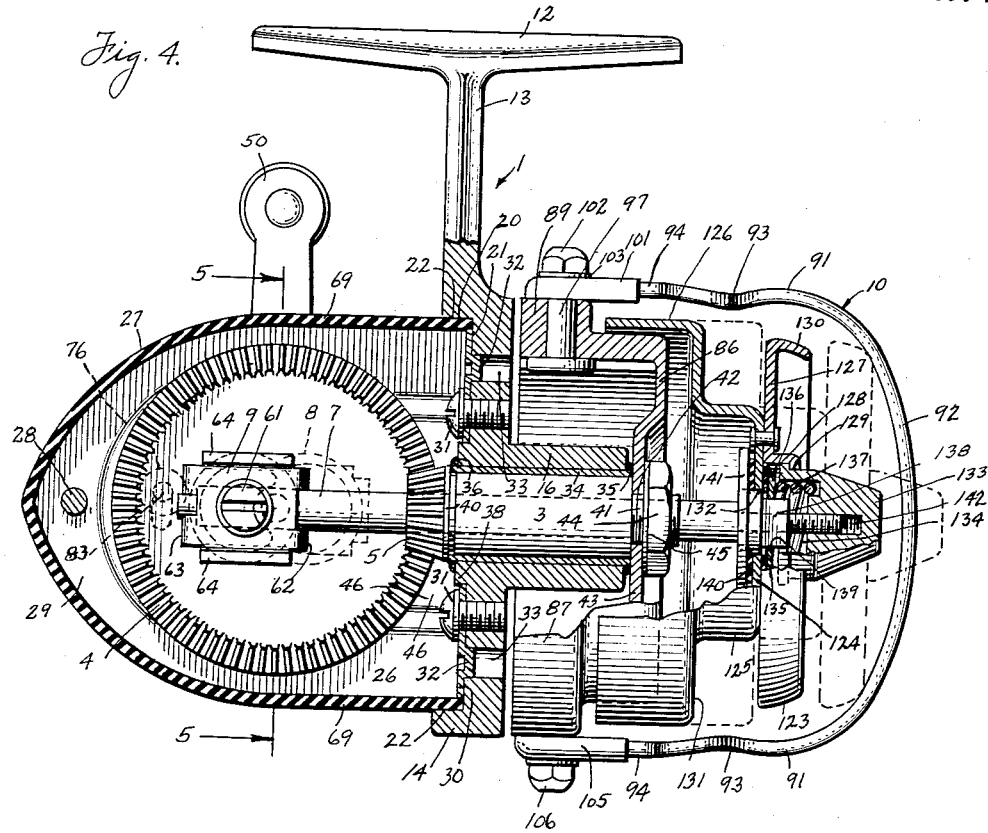
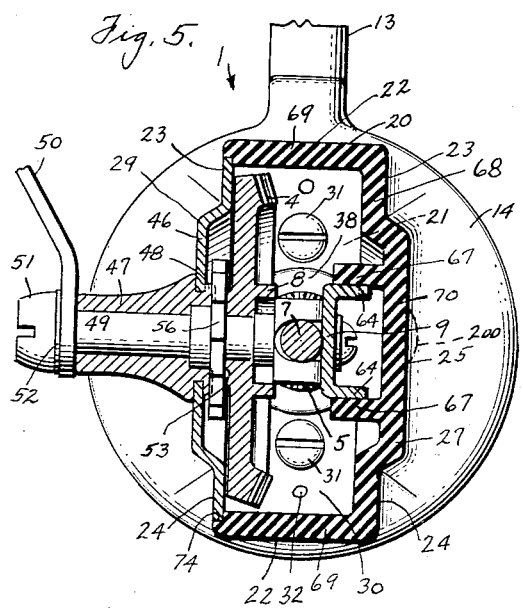
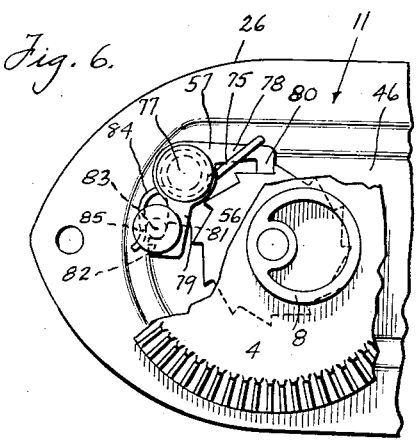
Inventor:
Morris E. Wood,
by Charles S. Penfield
His Attorney.

Feb. 14, 1961 M. E. WOOD 2,971,720
SPINNING REEL
Filed Dec. 5, 1955 3 Sheets-Sheet 3
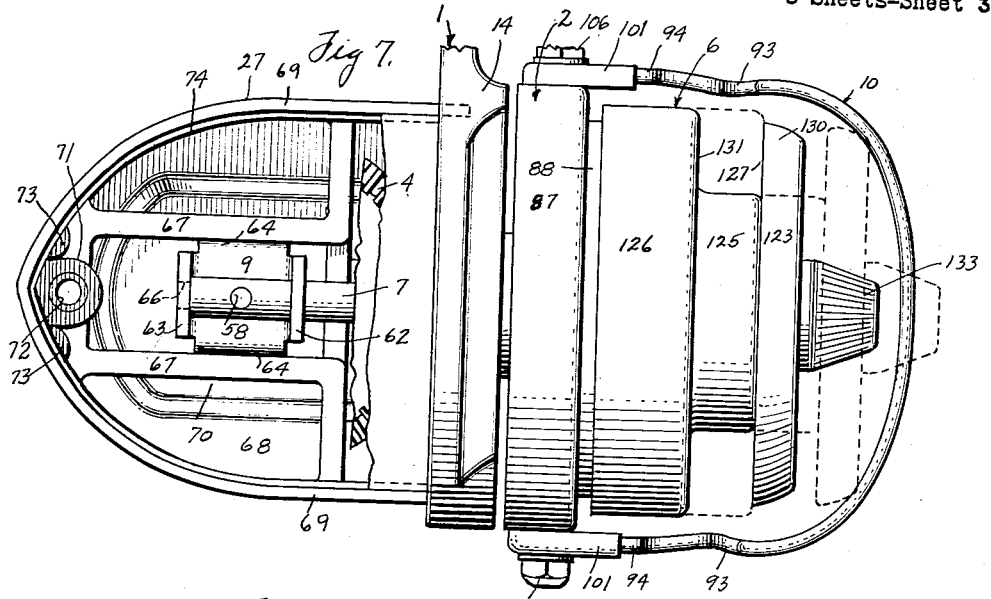
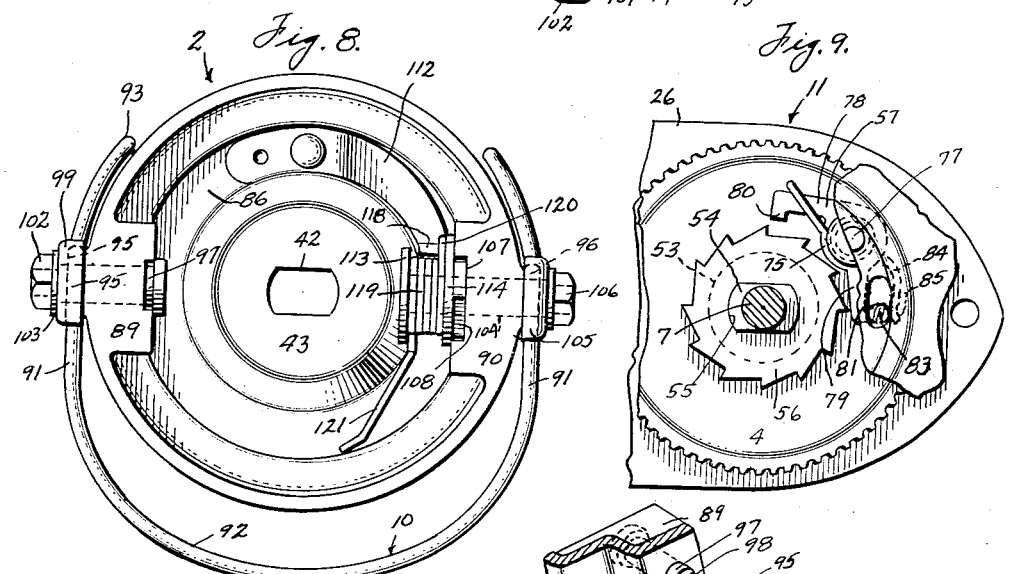
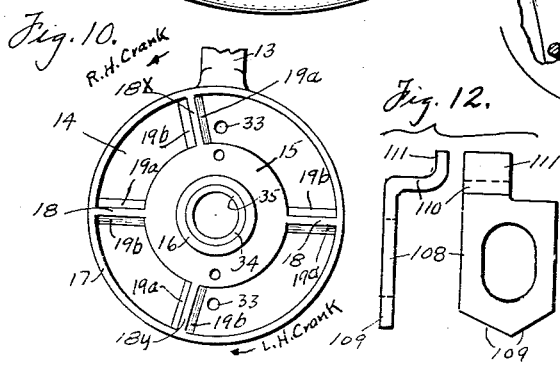
Inventor:
Morris E. Wood,
by Charles S. Aerfeld
His Attorney.

United States Patent Office 2,971,720
Patented Feb. 14, 1961

2,971,720

SPINNING REEL

Morris E. Wood, Bronson, Mich., assignor to Higbie Manufacturing Company, Rochester, Mich., a corporation of Michigan Filed Dec. 5, 1955, Ser. No. 550,910

11 Claims. (Cl. 242—84.21)

This invention relates generally to fishing tackle, and more particularly is directed to fishing reels of the spinning type.

The majority of reels of this character include, among other things, a rotor, a spool, a bail or line guide connected to the rotor, actuating mechanism operatively connected to the rotor and spool, and a drive assembly having a crank for operating the mechanism in a manner whereby to simultaneously rotate the rotor and reciprocate the spool relative to the rotor.

With the foregoing in mind, one of the principal objects of the invention is to provide a spinning reel in which improved principles of design and construction are embodied in each of the above components.

More particularly, an important object of the invention is to provide a reel in which the actuating mechanism is operatively connected with the rotor, spool and drive assembly in a unique manner.

A particular object of the invention is to provide a new way of connecting the bail and rotor together so that the bail can be manually pre-set to an inoperative position, preparatory to making a cast and after the cast is made and the reel is again placed in operation the bail will be automatically released so it will return to an operative position for guiding a line onto the spool. More specifically in this respect, the rotor is provided with a mechanism which coacts with the bail and fixed means on the reel for releasing the bail when desired.

A specific object of the invention is to design and construct the rotor and spool assembly in a manner whereby a portion of the rotor is received by the spool in lieu of the conventional arrangement in which the rotor receives the spool during reciprocation of the latter.

A significant object of the invention is to provide a reel with a novel click mechanism having a reversible ratchet assisting to adapt the reel for left or right hand use.

Another object of the invention is to provide a reel having a cover shell that can be snapped into position with respect to the reel frame.

An additional object of the invention is to provide a reel which is so designed and constructed that it may be readily modified for use by either the left or right hand of a person. More particularly in this regard, provision is made whereby the reel housing and the drive assembly, including a ratchet of the click mechanism, may be readily adjusted to different positions to facilitate converting the reel to such uses.

Another object of the invention is to provide an improved form of line guide having a pair of corresponding line guiding means, either of which may be utilized, depending on whether the reel is adapted for left or right hand use.

A further object of the invention is to provide a setup for releasing the bail to a line guiding position so that it will not engage the frame of the reel.

Another object of the invention is to provide a reel which offers advantages with respect to manufacture, assembly, cost and operation.

Other attributes and advantages of the invention will become apparent after the description hereinafter set forth is considered in conjunction with the drawings annexed hereto.

In the drawings:

Figure 1 is an exploded view showing the operative relationship of various sub-assemblies of the reel;

Figure 2 is a partial transverse sectional view illustrating structural details of the bail or line guide and mode of supporting it on the rotor, with the guide in an inoperative or line casting position;

Figure 3 is a transverse section, similar to Figure 2, showing the guide or bail in an operative position for directing a line onto the spool;

Figure 4 is a longitudinal view of the reel with portions in section to exemplify structural details;

Figure 5 is a transverse section taken substantially on line 5—5 of Figure 4;

Figure 6 is a partial view of the drive gear and click mechanism mounted on a support or bracket, with the mechanism in an operative position;

Figure 7 is a longitudinal view of the reel with portions broken away to illustrate the relationship of certain components and particularly the disposition of the actuating means;

Figure 8 is an end view of the reel with the spool assembly removed to show the interior construction of the rotor and the mechanism actable on the bail;

Figure 9 is a partial view, similar to Figure 6, with the click mechanism in an inoperative position;

Figure 10 is a front view of the head portion of the reel frame illustrating certain details thereof;

Figure 11 is an exploded view depicting the mode of fastening an end of the bail or line guide to the rotor; and Figure 12 are front and side views of a trigger constituting a component of the bail locking means.

The reel is comprised of a plurality of sub-assemblies so as to facilitate manufacture and assembly thereof. More particularly in this regard, and referring to Figures 1 and 6 of the drawing, the reel, among other things, includes a frame generally designated 1, a rotor 2 carried by a rotary shaft 3 driven through a drive gear 4 meshing with a pinion 5 on the shaft, a spool assembly 6 carried by a spindle 7 reciprocated through an eccentric 8 on the drive gear acting on a follower 9 fixed on the spindle, a bail or line guide 10 mounted on the rotor, and a click mechanism 11 as shown in Figure 6.

The structural characteristics of the reel frame 1 will be described first. This frame may be designed and constructed in various ways, but as herein illustrated, it is preferably cast from aluminum and includes an attaching shoe 12 for engaging a pole or rod, and a standard 13 which carries a round relatively thick head 14 disposed in a plane transverse to the longitudinal axis of the shoe and/or pole on which the reel is adapted to be mounted.

The front side of the head 14, as shown in Figures 1 and 10, is provided with a central boss 15 and a tubular cylindrical axial portion 16 extending forwardly of the boss. The head is also provided with a forwardly extending annular rim 17 and preferably with a pair of diametrically disposed radial ribs 18 and a pair of radial ribs 18x and 18y disposed at acute angles with reference to a line passing through ribs 18. Each of the aforesaid ribs include a pair of corresponding converging cam surfaces 19a and 19b. The ribs serve to reenforce the head and are also adapted to selectively cooperate with a part of the bail assembly to release the latter from the inoperative position shown in Figure 2, back to a line guiding position as shown in Figure 3, in a manner which will be described more in detail subsequently.

The rear side of the head 14 of the frame, as shown in Figures 4 and 5, is provided with a relatively large generally rectangular recess 20 disposed generally in alignment with the standard 13. This recess, as viewed in Figure 5, includes a base wall 21, end walls 22 and side walls. The side walls include a pair of upper opposed short parallel portions 23, a pair of lower opposed portions 24 corresponding to portions 23, and a pair of intermediate and longer portions 25 which are spaced apart a greater distance than the distance between the pairs of portions 23 and 24.

A housing is secured in the rectangular recess 20 and this housing includes a support member 26 and a shell member 27 which are complementary to one another and detachably secured together by a screw 28. The support carries the drive assembly, including the gear 4 and click mechanism 11 and the shell, among other things, serves to protect gears 4 and 5 and the click mechanism and also provides a guide for the follower 9 on the spindle 7 as will be explained later.

The support 26 and the mode of attaching it to the head 14 of the frame and the structure of the drive assembly will now be described. The support includes a rearwardly extending plate portion 29 which carries the drive assembly and click mechanism and an inner offset base portion 30, the latter of which is secured in the recess 20 by a pair of screws 31. In order to assist in stabilizing the position of the support, the base portion 30 is preferably provided with a pair of projections 32 which seat in holes 33 formed in the frame head 14. A tubular bearing 34 is secured in the forwardly extending axial tubular portion 16 of the frame by upsetting the ends of the bearing as indicated at 35 and 36. The offset base portion 30 of the support is also provided with a clearance opening 37 which receives a round boss 38 on the head to further assist in stabilizing the support. The tubular driven shaft 3 constituting a component of the actuating means of the reel, is journalled in the bearing 34 and extends through the opening 37 in the base 30 of the support 26. The inner end of this shaft carries the pinion gear 5. A washer 40 is preferably interposed between the inner upset end 36 of the bearing 34 and the pinion gear. As shown in Figures 1, 4 and 8, the outer end of the shaft is squared and threaded as indicated at 41 and extends through a squared opening 42 provided in a round recessed portion 43 formed on the rotor to key the rotor to the shaft. A nut 44 is connected to the threaded end of the shaft for securing the rotor to the shaft. A washer 45 having a squared opening receives the squared portion of the tubular shaft and is interposed between the bearing and the nut to promote free rotation of the shaft.

The rearwardly extending plate portion 29 of the support is provided with a lateral generally rectangular depression 46 within which the click mechanism is supported as shown in Figure 6. Attention is directed to the fact that the width of the plate portion is slightly less than the length of the rectangular recess 20 in the frame head 14 but slightly greater than the length of the base portion 30 of the support and that the free extremity of the plate portion is rounded and pointed to form an apex portion through which the screw 28 extends.

When the support 26 is secured in the recess 20 the base wall of the depression 46 will bear against one of the side wall portions 25 defining the recess in the head and those portions of the plate adjacent the depression will bear against aligned short wall portions 23 and 24 of the recess to additionally stabilize the support to maintain it in a predetermined fixed position so that the gears will properly mesh.

The drive assembly includes the support 26 and also a tubular bearing 47, as shown in Figure 5, which is permanently secured at right angles to the base wall of the depression 46 by providing the bearing with a reduced inner end which extends through an opening in the base wall and is upset at 48 against the inner side of the wall. A drive shaft 49 is journalled in the bearing. The outer end of this shaft is squared and provided with an axial threaded hole. A crank 50 for operating the shaft is provided with a squared opening which registers with the squared portion of the shaft to key them together and a screw 51 engaging the hole serves to secure the crank to the shaft for rotation therewith in a conventional manner. A washer 52 is preferably interposed between the head of the screw and the crank. The aforesaid parts or components, including the drive gear 4, comprise the driving means.

The drive gear is permanently secured to the inner end of the drive shaft 49 for rotation therewith. The outer face side of the gear is provided with a central round boss 53 having a squared portion 54 which is received in a squared opening 55 provided in a reversible ratchet member 56 for keying the ratchet to the gear as shown by the dotted and full lines in Figure 9. The boss serves to maintain the ratchet in spaced parallel relation to the front planar surface of the gear. The ratchet engages the upset portion 48 of the bearing, as shown in Figure 5, and the arrangement is such that the gear is maintained in spaced relation to the plate portion 29 of the support. The ratchet 56 constitutes a component of the click mechanism and is adapted for engagement and disengagement with a pawl 57 which will be described subsequently.

The inner face of the gear is provided with teeth which mesh with teeth on the pinion gear as mentioned above and is also provided with the round eccentric 8 which cooperates with the follower 9 on the spindle. The spindle 7 is provided with a threaded hole 58 and a reduced or squared end portion 59 as shown in Figures 1 and 4. The follower includes a base having an aperture 60 therein and a screw 61 extends through this aperture and into the hole in the spindle to secure the follower to the spindle with the latter against the base. The base is provided with a first pair of parallel offsets or fingers 62 and 63 which straddle and engage the eccentric 8 as depicted in Figure 4. The base is also provided with a second pair of similar offsets or fingers 64 disposed in planes transverse to the planes of the first pair of offsets. The offset 62 is provided with an opening 65 for the spindle and the offset 63 with a squared opening 66 which receives the reduced end 59 of the spindle to prevent relative rotation between the spindle and follower. The second pair of offsets 64 are disposed for guidance between a pair of parallel tracks 67 formed in the shell 27, the latter of which constitutes a component of the housing as alluded to above. The spindle and follower, including the pinion gear, may be considered to comprise the actuating means of the reel.

The shell 27 includes a base wall 68 and a pair of corresponding parallel walls 69 which converge to form an apex portion corresponding to the apex portion of the plate portion 29. The shell is preferably cast from a non-metallic material, such as a phenolic condensate or pyroxylin plastic, and is reenforced internally by suitable web structure. The base wall 68 is formed to provide a depression 70 substantially corresponding in size and shape with the depression 46 in the support so as to promote the appearance of the reel. The shell is also provided with a boss 71 at its apex and an internally threaded member 72 is anchored in the boss for connection with the screw 28. The shell is further provided with a pair of abutments 73, the outer ends of which are flush with the base of a rabbet 74 provided in the rim of the walls 69. The plate portion 29 of the support seats in the rabbet and against the abutments when the shell is properly associated with the frame and support and the screw 28 is tightened. When the shell is disposed in the rectangular recess 20 in the head 14 of the frame opposite the support, the base wall of the depression 70 will engage a wall portion 25 of the recess and the walls 69 of the shell will engage the end walls of the recess, while those portions of the base wall of the shell adjacent the depression will engage aligned portions 23 and 24 of the recess. The shell fits snugly in the recess and the screw 28 secures the shell in place and to the support. In order to assist in retaining the shell in the recess, its base wall 68 is preferably provided with an exterior projection 200 adjacent its inner marginal edge which engages a side wall portion 35 of the recess 20 to cause the base wall to slightly yield or flex. With this setup the shell can be more or less snapped into the recess and is resiliently held therein.

As illustrated in the drawings the reel is assembled for use in a depending position by the left hand of a person. To convert the reel for use in a depending position by the right hand the screw 28 is first removed to release the shell 27 from the reel frame and support. The screw 51 is then removed to release the crank 50. The screw 61 secured to the spindle 7 is next removed so that the spindle can be moved forwardly to release the follower 9. The screws 31 are next removed so as to release the support 26 to permit removal of the drive gear and its shaft 49 from the bearing 47 so that the ratchet 56 can be removed from the shaft and then replaced in a reversed position. The parts are then reassembled, with the support and shell in reversed positions on the frame to place the reel in condition for right hand use with the reel disposed in a depending position on a pole or rod.

Attention is directed to the fact that the operative relationship between the drive gear and pinion gear is maintained by the support which is held in a predetermined position by the screws 31 and the projections 32 on the support extending into the holes 33 in the frame.

The click mechanism 11 includes the ratchet 56, pawl 57, a spring 75 and a manually operable button 76 movable in a slot provided in the depression 46 as shown in Figures 4, 6 and 9. The pawl is mounted on a pivot 77 and includes a pair of legs 78 and 79 disposed substantially at right angles with respect to one another. The leg 78 is provided with an abutment 80 and the leg 79 with a notch 81 and a rest 82. The spring 75 is coiled about the pivot 77 between its head and the pawl and has a portion caught on the leg 78 and a portion bearing against a shank 83 of the button. The portion of the spring bearing on the shank 83 includes a curved portion 84 and a convex abutment 85. This arrangement is preferably such that when the button is moved in the slot so that its shank 83 is disposed against the rest 82 on the leg 79 and on one side of the convex abutment 85 on the spring, the pawl will be held in a retracted position so that the abutment 80 on the pawl cannot engage the teeth on the ratchet. However, when the button is moved toward the pivot 77 the convex abutment 85 will cause the button and pawl to snap to operative positions so that the abutment 80 on the pawl will selectively engage the teeth to cause a clicking sound when the drive gear is rotated in one direction and at the same time will prevent rotation in an opposite direction. When the button is moved to the aforesaid operative position it is held in this position with its shank caught between the notch 81 and the curved portion 84 of the spring until the button is again shifted to its inoperative position.

The structural characteristics of the rotor carried by the tubular shaft 3 and the bail device will now be described. The rotor is cup-shaped and includes a front base wall 86 provided with the recessed boss 43 having the squared opening 42 therein which receives the tubular shaft 3 as alluded to above. The rotor includes a rear cylindrical portion 87 and a cylindrical front portion 88 of a smaller diameter but of a slightly greater axial extent than portion 87. The rotor is provided with a pair of diametrically disposed internal thickened axially extending formations 89 and 90 having transversely aligned apertures therein.

The bail 10 is generally U-shaped and includes a pair of corresponding parallel portions 91 joined together by a curved portion 92 disposed at an angle with reference to the plane of the portions 91. The portions 91 are provided with corresponding inturned elbow portions 93 which terminate in portions 94 having eyes or loops 95 and 96. The portions 94 are straight and disposed in parallel relation and substantially at right angles to the plane formed by the portions 91. The bail is unique because either of the elbows may be utilized to guide a line onto the spool depending on the direction of rotation of the rotor. A bolt or shaft 97, as shown in Figures 7, 8 and 11, extends through the transverse aperture in the formation 89 and through the eye 95 of the bail for pivotally connecting one end of the bail to the rotor. The shank of the bolt is provided with a squared portion 98 and a shroud 99 is provided with a squared opening 100 which receives the squared portion of the shank to key the shroud to the shank. The shroud conceals the eye and includes a channel portion 101 which receives a portion 94 of the bail so that the bail will move with the shroud and shank of the bolt. A nut 102 is attached to the shank with a lock washer 103 interposed between the nut and shroud.

A bolt or shaft 104 extends through the aperture in the other axial formation 90 and through the eye 96 at the other end of the bail 10 and a shroud 105 and nut 106 are operatively connected to the shank of this bolt and the bail in substantially the same manner that the other end of the bail is attached to the rotor. The inner side of the formation 90 is provided with an axially extending recess 107 forming a guideway for an elongated trigger 108 slidable therein. This trigger, clearly shown in Figure 12, is slotted to provide clearance for the shank of the bolt and limit outward movement of the trigger. The outer end of the trigger is provided with a pair of straight converging cam surfaces 109 and its other end is provided with an offset leg 110 having a finger 111 thereon.

A leaf spring 112 has one end anchored to the base wall 86 of the rotor by a rivet and its free end bears on the finger 111 of the trigger to normally urge the trigger rearwardly so that one end of the slot in the trigger will serve as a stop to locate the cam surfaces 109 on the trigger exteriorly of the rotor in a predetermined extended position for engagement with any one of the radial ribs 18 on the head 14 of the reel frame when the rotor is rotated. The shank of the bolt 104 is provided with a head 113 and with a latch 114 fixed on the shank in spaced relation to the head and engaging the trigger to assist in holding the trigger in its guideway. The latch 114 is provided with a notch 115 forming an abutment 116 and is further provided with an adjacent curved surface 117 and an offset projection 118. A wire spring 119 has a portion coiled about the shank of the bolt between the head and the latch. One end of the spring has a hook 120 caught on the projection 118 and its other end 121 is elongated and offset with respect to the coil and engages the base wall and the cylindrical portion of the rotor as shown in Figures 3 and 8.

The aforesaid parts are so designed and constructed that the spring 119 serves to normally urge the latch and bolt in a direction to place the bail in a line guiding position in front of the spool assembly as depicted in Figures 1 and 3. When the bail is manually pivoted from an operative position, as shown in Figure 3, to an inoperative position, as shown in Figure 2, to permit the line to freely unwind from the spool assembly, the bolt and latch will rotate causing the curved surface 117 on the latch to cam and move the trigger 108 rearwardly and under the influence of the leaf spring 112 until the leg 110 on the trigger snaps into the notch 115 and against the abutment 116 to lock the trigger in the predetermined extended position above referred to. As will be described more in detail subsequently, when the rotor is rotated in one direction by the left hand one of the cam surfaces 109 on the trigger will be caused to engage one of the cam surfaces 19a on one of the radial ribs on the frame head 14 to cause the trigger to move forwardly and when the leg 110 on the trigger moves out of the notch 115 in the latch, the bolt and latch will be rotated by the spring 119 to automatically pivot the bail back to the operative line winding position as shown in Figure 3. The spring 119 is of sufficient strength to snap the bail to said operative position which is predetermined by the leg 110 and/or finger 111 engaging the offset projection 118 on the latch.

The spool assembly 6, as clearly exemplified in Figures 1, 4 and 7, includes a rear cup-shaped part 122 and a front part 123 which are secured together by rivets or equivalent means. The rear part includes a base wall 124, a cylindrical portion 125, and a cylindrical portion 126 of a larger diameter than the diameter of the portion 125. The front part of the spool assembly includes a base wall 127 provided with a forwardly extending cylindrical portion 128 having a wall provided with an opening 129 therein. The base wall is also provided with a forwardly extending peripheral flange 130. The cylindrical portion 125 of the rear spool part serves as an arbor on which the line is wound and the base wall 127 of the front part and a radial portion 131 of the rear part constitute side flanges of the arbor or spool. The larger rear cylindrical portion 126 of the rear part of the spool telescopically receives the forward cylindrical portion 88 of the rotor when the spool is reciprocated by the spindle 7 actuated by the connection between the follower 9 and the eccentric 8.

The base wall 124 of the rear part of the spool is provided with an opening 132 and a knurled knob 133 is disposed in the opening 129 in the base on the front part of the spool. The knob is provided with an internal recess 134 and has an annular radial flange disposed in the cylindrical portion 128 of the front spool part for holding the knob assembled with the spool. A metal washer 135, a resilient washer 136 and a helical spring 137 are arranged in the cylindrical portion 128. The resilient washer 136 engages the base wall 124 of the rear spool part 122 and receives a squared enlargement 138 on the spindle 7. The metal washer has a squared opening 139 which also receives the squared portion on the spindle for keying this washer to the spindle. The helical spring 137 has one end seated in the recess 134 and its other end bears against the metal washer 135. Another resilient washer 140 is carried by the spindle and engages a transverse plate 141 fixed on the spindle. The knob is also provided with an internal axially threaded aperture 142 which connects with a threaded portion of the spindle to cause the base 124 of the rear spool part 122 to be frictionally held between the resilient washers 136 and 140, the degree of friction being variable and determined by the tightness of the knob on the spindle.

With respect to the operation of the reel and particularly the actuation of the line guide, attention is directed to the fact that the radial ribs 18 and 18x and 18y are located in predetermined positions on the frame head 14. As alluded to above, when the reel is assembled for left hand use, as depicted in the drawings, the trigger 108 is actuated to release the line guide by engaging any one of the cam surfaces 19b on each rib, and when the reel is converted over for right hand use, the trigger will similarly be actuated to release the line guide by engaging any one of the cam surfaces 19a on the ribs.

As illustrated in Figure 10, the indicia "L. H. Crank" and the associated arrow, indicates movement of the rotor in a clockwise direction so that one of the cam surfaces 109 on the trigger will engage any one of the cam surfaces 19a on the ribs, whereas "R. H. Crank" and arrow associated therewith, indicates movement in a counter-clockwise direction so that the other of the cam surfaces 109 will engage any one of the rib cam surfaces 19a to release the guide. It is, of course, understood that the line guide has to be manually swung to the inoperative position before it can be automatically released by the trigger engaging any one of the ribs. The ribs 18x and 18y are disposed as depicted so that the guide will be released at locations to prevent it from engaging the part of the reel frame such as the standard or post 13.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A rotor assembly for a fishing reel comprising a cup having a bottom wall and a cylindrical side wall, a rotatable shaft extending radially through the side wall, said shaft having a squared portion and a threaded portion, a line guide having a portion embracing the shaft, a shroud member having a squared opening receiving the squared portion of the shaft and a portion receiving the guide, and a nut attached to the threaded portion of the shaft and securing the member to the shaft so that rotation of the shaft will cause the shroud member to rotate the guide therewith.

2. A rotor assembly for a fishing reel comprising a cup having a bottom wall and a cylindrical side wall, a rotatable shaft extending radially through the side wall and having exposed inner and outer ends, the outer end of said shaft having a squared portion and a threaded portion, a line guide having a portion embracing the outer end of the shaft, a shroud member having a squared opening receiving the squared portion of the shaft and a portion receiving the guide, a nut attached to the threaded portion of the shaft and securing the member to the shaft so that rotation of the shaft will cause the shroud member to rotate the guide therewith, and resilient means carried by the inner end of the shaft and finding support on the rotor serving to urge the shaft and guide as a unit in a predetermined rotative direction.

3. A subassembly of a fishing reel comprising a one-piece frame having a plate-like portion, means extending axially and forwardly from one side of the portion for supporting a shaft, the opposite side of the portion being provided with a recess, a mounting member secured in the recess for supporting a drive assembly, a shell member disposed in the recess opposite the mounting member to form with the latter a housing, and means on the shell acting on a wall defining a part of the recess to cause the shell to be resiliently held in the recess.

4. A frame for a fishing reel comprising a post and a round substantially flat portion having a central tubular portion for supporting a rotatable component and a concentric annular portion provided with a plurality of radial abutments, said abutments being arranged in a predetermined relationship to the post with certain of said abutments being substantially diametrically disposed, and others being disposed at acute angles with reference to a line passing through the diametrically disposed abutments.

5. A subassembly including a one-piece frame for a fishing reel, said frame comprising a round substantially planar portion, a standard of appreciable length extending radially therefrom and a plate extending transversely of the standard for engaging a rod to place the planar portion transverse to the longitudinal axis of the rod, said planar portion being provided with an integral tubular portion at its front side for supporting a shaft and a relatively large rectangular recess in its rear side, a crank supporting member having a portion secured in the recess, a shell member having a portion disposed in the recess and forming with said crank supporting member a casing, and means for detachably securing the members together.

6. A fishing reel subassembly comprising a frame of short axial extent having a substantially round relatively thick head provided with a pillar extending therefrom for attaching the frame to a pole, a mounting member having a flange and a plate portion, means securing the flange to the head for locating the plate portion in a plane substantially perpendicular to the plane of the head, a tubular part extending through the head and flange, a driving element carried by the plate portion, a housing member secured to the mounting member and having a wall arranged in parallel relation to the plate portion, said wall being provided with longitudinally extending guide means, a shaft reciprocably mounted in the tubular part between said plate portion and said wall, means fixed on the shaft for engagement and guidance by the guide means, and means carried by the driving element operatively connected to the fixed means for reciprocating the shaft and fixed means as a unit when the element is rotated.

7. A fishing reel subassembly comprising a frame of short axial extent having a relatively thick supporting head and means for attaching the same to a pole, said head being provided with a centrally disposed recess in one side and a tubular bearing extending outwardly from its other side, a shaft reciprocably mounted in the tubular bearing, a mounting member having a portion secured in the recess and a side portion extending outwardly and perpendicular to the head of the frame, a driving element rotatably mounted on the side portion, a housing member having a portion secured in the same recess and a wall arranged in substantially parallel relation to the side portion of the mounting member, a guideway provided on the wall in parallel relation to the shaft and side portion, a fitting fixed on the shaft for engagement and guidance by the guideway, and means carried by the driving element operatively connected to the fitting for reciprocating the shaft in the tubular bearing when the element is rotated.

8. A fishing reel subassembly comprising a frame of short axial extent having a relatively thick supporting head and means for attaching the frame to a pole, said head being provided with a tubular bearing extending from one side thereof, a tubular part journaled in the bearing and provided with a pinion, a shaft reciprocably mounted in the tubular part, a mounting member secured to the opposite side of the head and having a side portion extending perpendicular thereto, a driving element rotatably mounted on the side portion, a shell member secured to the frame and side portion and forming therewith a casing, said shell member having a side wall arranged in parallel relation to the side portion, a guideway provided on the side wall, a fitting fixed on the shaft for engagement and guidance by the guideway, and means including a gear carried by the driving element for respectively engaging the fitting and the pinion for reciprocating the shaft and rotating the tubular part when the element is rotated.

9. A fishing reel comprising a frame of short axial extent having a substantially round relatively thick head provided with a pillar extending therefrom for attaching the frame to a pole, a first mounting member having a plate portion and a flange secured to one side of the annular portion of the frame to locate the plate portion in a plane substantially perpendicular to the head, a driving element rotatably mounted on the plate portion and provided with a drive gear, a rotatable tubular shaft extending through the head and the flange and provided with a pinion engaging the drive gear, a reciprocable shaft extending through the tubular shaft, a spool supported on the outer end of the reciprocable shaft and a fitting having spaced abutments carried by the inner end of said reciprocable shaft, a rotor carried by the tubular shaft and provided with a pickup member for directing a line onto the spool, a second mounting member secured against the head of the frame and having a wall disposed in spaced parallel relation to the plate portion, said wall on its inner side being provided with a longitudinally extending guideway in which the fitting is disposed for sliding movement, and said drive gear being provided with an eccentric arranged between the abutments on the fitting for reciprocating the reciprocable shaft, fitting and spool as a unit when the driving element and gear are operated to rotate the tubular shaft and rotor carried thereby.

10. A fishing reel subassembly comprising a frame supporting a reciprocable shaft provided with a fitting, a removal housing member connected to the frame and having a wall disposed in spaced parallel relationship to the shaft, said wall being provided with a pair of longitudinally extending guides, and said fitting being provided with means disposed at one side only of the shaft axis between and engaging the guides for guidance and with means at only the opposite side of the shaft axis for engaging a driving element to reciprocate the shaft and fitting.

11. A fishing reel comprising a frame having a wall provided with circumferentially spaced abutment means, a cup rotatably mounted on the frame and having a bottom wall parallel to said frame wall and also having a cylindrical side wall, said side wall being provided with a guideway extending axially and perpendicular to planes formed by said frame wall and said bottom wall, a slotted trigger slidable in said guideway, said trigger having an abutment and an end extending toward said frame wall for engaging any one of said abutment means, resilient means for normally urging the trigger toward said frame wall, a rotatable shaft extending radially through said side wall and said slot in the trigger, a line pickup keyed to the outer end of the shaft, a latch keyed to the inner end of the shaft and provided with an abutment and a spring acting on said latch for normally urging the latch, shaft and pickup as a unit in a predetermined rotative direction to cause the abutment on the latch to engage the abutment on the trigger to maintain the pickup in a predetermined inoperative position, the arrangement being such that when the cup is rotated the said end of the trigger will engage one of said abutment means to retract the trigger and disengage its abutment from the abutment on the latch in a manner whereby the spring will cause the unit to rotate to locate the pickup in a line winding operative position.

References Cited in the file of this patent

UNITED STATES PATENTS

| | | |
|---|---|---|
| 2,498,987 | Duncan | Feb. 28, 1950 |
| 2,546,465 | Martini | May 27, 1951 |
| 2,589,048 | Bureau | Mar. 11, 1952 |
| 2,632,608 | Vincent | Mar. 24, 1953 |
| 2,668,025 | Hull | Feb. 2, 1954 |
| 2,676,769 | Sarah | Apr. 27, 1954 |
| 2,713,463 | Sarah | July 19, 1955 |
| 2,719,680 | Denison et al. | Oct. 4, 1955 |
| 2,724,563 | Shakespeare | Nov. 22, 1955 |
| 2,734,693 | Rabezzana | Feb. 14, 1956 |
| 2,775,417 | Freund | Dec. 25, 1956 |
| 2,863,617 | Chapin et al. | Dec. 9, 1958 |

FOREIGN PATENTS

| | | |
|---|---|---|
| 430,866 | Italy | Feb. 20, 1948 |
| 957,937 | France | Aug. 29, 1949 |
| 1,036,587 | France | Sept. 5, 1953 |
| 724,601 | Great Britain | Feb. 23, 1955 |